United States Patent Office 3,378,504
Patented Apr. 16, 1968

3,378,504
FOAMED EPOXY RESIN USING TRIALK-OXYBOROXINES AS CATALYTIC BLOWING AGENTS
Henry L. Lee, Jr., San Marino, Calif., assignor to Callery Chemical Company, Pittsburgh, Pa., a corporation of Pennsylvania
No Drawing. Continuation-in-part of application Ser. No. 840,805, Sept. 18, 1959. This application Oct. 21, 1964, Ser. No. 405,590
8 Claims. (Cl. 260—2)

ABSTRACT OF THE DISCLOSURE 3,4 - epoxy - 6 - methylcyclohexylmethyl-3,4-epoxy-6-methylcyclohexanecarboxylate is cured to a solid or rigid foam by reaction with trialkoxyboroxine. Foaming or accelerating agents may be used in foam cures.

---

This application is a continuation-in-part of my application Ser. No. 92,167, filed Feb. 28, 1961, which is a continuation-in-part of application Ser. No. 840,805, filed Sept. 18, 1959, both now abandoned.

This invention relates to new epoxy resins and to a novel method of making the same.

Cellular, foamed, or expanded plastics or resins vary in density from 0.1 to 60# ft.$^3$. They can be produced in the form of slabs, blocks, boards, sheets, molded shapes, extruded insulation and sprayed coatings. Specific applications of these expanded plastics are dependent on their physical characteristics and chemical properties and frequently new formulations must be tailor made for new end-use requirements. In addition a few can be foamed in place in an existing cavity for building wall insulation or for equipment encapsulation. Rigid cellular resins with good structural and insulating properties, as differentiated from flexible or rubbery resins, which can be foamed-in-place at normal ambient temperatures are of particular interest for diversification of uses. Room temperature initiated curing of foamed resins does not require the rather massive, both as to cost and size, curing equipment that is required for the heat curing of resins. Thus these are more practical for small fabricators and foamed resin users permitting a much wider application of foamed resins and a wider dispersion of foamed resin producers. Since these foamed resins can be up to ten times or more the bulk of the unfoamed ingredients, a substantial saving in transportation costs is accomplished by this dispersion of producers.

Fast gelling resins that cure to a solid resin are useful in casting, encapsulating, potting and the like, and are especially useful as fast setting sealants or surface coating materials. In surface coating applications they are conveniently applied by separately supplying the epoxide and the curing agent to a blending nozzle, where the fast gelling composition is formed and simultaneously sprayed on the surface to be coated.

The new epoxy resins of this invention are formed by a simple room temperature mixing of the constituents which includes an epoxide prepolymer and a curing agent, the proportion of which may be adjusted to give a cellular foam or a solid resin, and if desired may include a foaming agent, a foaming accelerator and a suitable surfactant. Shortly after mixing the constituents a strong exothermic reaction takes place; if sufficient curing agent is used and/or if a foaming agent is present the exothermic reaction is accompanied with a strong foaming action. The set to a rigid foam or solid is measured in seconds, while the cure may continue for minutes or hours. The foamed epoxy resins are well adapted for the less sophisticated foamed resin producers and for small shop or on site production. They offer a great versatillity in formulations and can be made with very low densities, good mechanical properties, good resistance to chemical attack and with a high closed cell ratio for insulating purposes.

The manufacture of cellular resins in which the foaming is produced by the development of a dispersion of minute gas bubbles in the resin during curing is well recognized as largely an empirical art and this is no less true with my invention. This results from the many variables involved and the critical interrelationship of the curing and the foaming. Not only is it necessary that the proper amount of gas be liberated to produce a finished foamed resin of a suitable density, but also it is critical that the gas liberation be properly timed with the curing reaction, that is, the hardening of the resin by cure should take place at the moment of maximum expansion. And in this connection temperature is important. The timing of the curing-foaming action, the ultimate cure temperature, the amount of foaming, the cell structure and cell size, hardness, strength and other properties are affected by the selection and/or proportioning of the several constituents and by other variables including batch size, degree of mixing, etc., as ascertained from an empirical study. The following disclosure of my invention will describe in detail the several materials usable in formulating the foamed resins, their interrelationship and effect in this curing-foaming reaction, and specific embodiments will be described so that foamed resins can be readily made hereunder by those skilled in the art.

The main epoxy monomer or prepolymer to which my invention relates is a dicyclohexene oxide carboxylate of which 3,4 - epoxy-6-methylcyclohexylmethyl-3,4-epoxy-6-methylcyclohexanecarboxylate (hereinafter referred to as EP–201) is a representative member having the following structural formula:

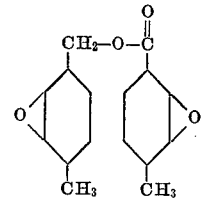

I have found that when about 10 parts (hereinafter parts refers to parts by weight) of a lower alkoxyboroxine such as trimethoxyboroxine is added to 100 parts of the dicyclohexene oxide carboxylate such as EP–201 an immediate exothermic reaction occurs and, if insulated against heat loss, will evolve a gas. This evolving gas is trapped in the curing resin as it hardens as dispersed bubbles to produce a rather dense foam. If less than about 10 parts of trimethoxyboroxine is used for each 100 parts of EP–201 no significant bubbling results presumably in part resulting from a reduction in the cure rate and a consequent dispersion of heat. However, when the proportion of trimethoxyboroxine is increased an increase in foaming results with a reduction in the density of the resulting product. The lowest density foams have been produced by the use of additional materials which promote the foaming. These added materials are classified herein as foaming agents, foaming accelerators and surface active agents and their effect on the foaming will be more explicitly set forth.

The trialkoxyboroxines used in the production of these new cellular resins have the empirical composition

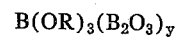

where R is a lower alkyl radical, and y is equal to, greater than, or less than 1. They are fluid and are readily prepared by well known methods by heating boric oxide and the corresponding borate ester in various proportions, or by partial hydrolysis of borate esters. Where $y$ equals 1, the trialkoxyboroxine has a six-membered cyclic structure of repeated boron-oxygen bonds:

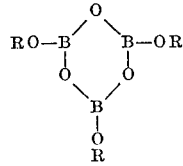

The structure of alkoxyboroxines containing a higher or lower proportion of $B_2O_3$ has not been determined, but I have found them equally useful for the purposes of the invention in the proper formulations as the trialkoxyboroxine in which $y$ equals 1. Increasing the proportion of $B_2O_3$ increases the viscosity of the material and decreasing its proportion decreases its viscosity. In view of its availability and modest cost the first member of this group, trimethoxyboroxine is preferred.

As indicated above the trialkoxyboroxine functions both as a curing agent and as a foaming agent. As a curing agent it is believed that it functions both catalytically and as a cross linking agent which would account for its efficacy over a wide range of compositions. I have ascertained that lighter foams are obtained if a material functioning solely as a foaming or blowing agent is added to supplement the foaming action of the trialkoxyboroxine particularly when smaller amounts of the alkoxyboroxine are used. Suitable for this purpose are lower alkyl borate esters, such as trimethyl borate, triethyl borate, tri-n-propyl borate and tri-isobutyl borate by way of exemplification. Also liquid hydrocarbons and liquid halogenated hydrocarbons are very useful blowing agents. Pentane, hexane, benzene, xylene, carbon tetrachloride and trichloromonofluoromethane are representative of this category. The blowing agent is believed to function entirely in a mechanical sense, that is during the exothermic curing reaction it is quickly vaporized within the mix to form a profusion of small bubbles or cells. The foaming agent should be chemically inert to the ingredients and product. It should be a liquid at room temperature and it should vaporize at a temperature no higher than that temperature reached in the resin at which it hardens to a rigid foam and preferably below this temperature. Other organic liquids in addition to those specified above which fulfill these requirements are useful and are included within the scope herein.

The exothermic reaction following admixture of the ingredients will cause a heat buildup to a maximum temperature followed by a gradual cooling. It has been noted that the hardening of these resins occurs prior to completion of the cure and before the maximum temperature is reached, that is, after hardening, to a set the resin continued to heat up and continues its cure. It has also been observed that there is a variation in the hardening temperature with different formulations and conditions as well as in the maximum temperature reached. Since the foaming agent contributes to the foaming action by its vaporization, selectivity should be exercised for each specific formulation in order to coordinate the foaming with the hardening. For example, it is desired that all of the foaming be completed prior to hardening. If a foaming agent having a boiling point between the temperature at which a specific resin formulation hardens and its maximum temperature is used, the delayed vaporization will produce fissured foam as well as prevent a full utilization of the foaming agent. On the other hand premature volatilization may result in a partial collapse of the foam particularly with respect to formulations with which there is a greater time interval between mixing and hardening.

Superior foams have resulted from formulations which hardened in a very short period of time. For example, very satisfactory foams have been produced in which the time for curing to a rigid set after mixing the ingredients has been from five to ten seconds. Those formulations requiring more than a minute to form a rigid set have not in general produced as low a density foam as the quicker hardening compositions. A further variation of the foaming can be accomplished by using a mixture of two or more blowing agents of different boiling points to effect a sequential blowing as the mix heats up to the hardening temperature.

I have also found it desirable in some formulations to use a material which I call a foaming accelerator. This material will cause an increase in the foaming to a marked degree and a decrease in the density of the foam out of proportion to the amount added. Water and lower alkyl alcohols are good foaming accelerators when added in as little as 1 or 2 parts per hundred parts of prepolymer. It is believed that at least a part of its function in the reaction is the opening of the boroxine ring. It has been observed that the foaming accelerator increases somewhat the rate of cure and that a higher maximum temperature is reached with its use. Also foams made with a foaming accelerator tend to have an improved whiteness. It is desirable that the amount of foaming accelerator not exceed about 5 parts per 100 parts of resin and it should preferably be kept below this for increased foam strength.

A suitable surfactant can induce smaller and more uniform cell formation to give an overall improvement in appearance and an improvement in properties including a somewhat greater resiliency and decrease in brittleness. The silicone fluids comprising dimethyl and phenylmethyl polysiloxanes either separately or admixed are useful for this purpose. As little as 1 or 2 drops per hundred parts of the prepolymer up to about 2 parts per hundred parts of prepolymer will improve cell structure of the foam. Those surface active agents which cause a modest reduction in the surface tension of the prepolymer and the formation of smaller more stable cells is preferred; however, care must be exercised to avoid the choice of a surfactant which may cause an undesirable defoaming action.

It has been discovered that the mixing of the ingredients is important to the character of the resulting foam and is therefore an important variable. If the ingredients are not well mixed, a more likely occurrence with the quick curing formulations, the resulting foam may be non-uniform, dense, and poor in quality. Improved mixing results in an improved foam, faster hardening, and a significant decrease in foam density.

The following examples give specific embodiments of my invention.

Example I 116 grams of trimethoxyboroxine, 16 drops of Dow Corning 710 Fluid (a mixture containing a major proportion of phenylmethylpolysiloxane and minor proportion of dimethylpolysiloxane) and 8 ml. of carbon tetrachloride were concurrently introduced into 200 g. of EP–201 monomer with high speed stirring (rotating blade at 4,000 r.p.m.). All materials were at about 20° C. prior to mixing. The stirring was continued for 3 seconds and the blade was removed. The mixture began foaming upon admixture and cured to a rigid foam 5 seconds after stirring was stopped. After cooling the resulting foam was found to have a density of 2.48 #/cu. ft., and consisted of small uniformly sized cells. This foamed resin possessed an excellent appearance, was very white, and possessed good resistance to hydrolytic degradation. In further tests additional carbon tetrachloride did not improve the product.

Example II

The test in Example I was repeated except that trimethyl borate was substituted for the carbon tetrachloride. It was found that it took 15 g. of trimethyl borate to produce the low density foam of Example I. The other properties of this foam were comparable with the foam produced in the preceding example.

Example III

The amount of carbon tetrachloride of Example I and trimethyl borate of Example II was reduced. In each instance good quality foams were produced of gradually increasing density even to the point where neither blowing agent was added.

Example IV

The first experiment was repeated except that the mixture was hand stirred with a spatula. The resulting foam was inferior possessing both a greater density and unevenness in texture.

Example V

The first example was repeated with no surface active agent. The density of the product was about the same but there was a significant variation in cell size. It was discovered that at least 4 drops of the surfactant was needed to get a satisfactory uniformity of cell size and that no improvement was noted upon the addition of more than 20 drops.

In further experimentation with all factors held constant and using water as the foaming accelerator, it was ascertained in going from trimethyl borate through the intermediate borates up to tri-n-butyl borate, comparing equivalent weights of these foaming agents, that denser foams were produced with evidence of delayed gassing. The same effect was observed in comparing trimethoxyboroxine with higher alkoxyboroxines up to and including tributoxyboroxine. It was also discovered, in comparing equivalent weights, other factors held constant, that water is superior to the lower alcohols as a foaming accelerator. When more than about 5 parts of water to 100 parts of prepolymer was used, it was discovered that a very low density foam was produced of very low strength. Many blowing agents were compared including liquid hydrocarbons, liquid halogenated hydrocarbons and the trialkyl borates with a wide range of properties obtained in the resulting product consistent with the volatility of the additive.

The size of the batch is important in its effect on the temperature of the curing mixture—the larger the batch the less the loss of heat to the container wall and surroundings, resulting in a higher temperature. A large variation in the batch size may therefore require a small adjustment in the formulation to accommodate this variation in temperature rise.

Additional examples are tabulated below and are indicative of the trend in varying the formulations. These examples are based on 100 parts of EP-201 prepolymer and were all manually stirred:

| No. | TMOBX | MB | Water | Spec. Grav., g./cc. |
| --- | --- | --- | --- | --- |
| 6 | 20 | 2 |  | .8 |
| 7 | 20 | 5 |  | .2 |
| 8 | 20 | 10 |  | .2 |
| 9 | 20 | 20 |  | .2 |

TMOBX = trimethoxyboroxine; MB = trimethylborate.

The following runs were based upon 50 parts of EP-201 prepolymer and manual stirring:

| No. | TMOBX | MB | Water | Spec. Grav., g./cc. |
| --- | --- | --- | --- | --- |
| 10 | 20 | 0 | 1 | .5 |
| 11 | 20 | 5 | 1 | .3 |
| 12 | 20 | 10 | 1 | .1 |
| 13 | 20 | 5 | 0 | .5 |
| 14 | 20 | 5 | 2 | .1 |
| 15 | 29 | 5 | 0 | .3 |
| 16 | 29 | 5 | 1 | .1 |
| 17 | 29 | 5 | 2 | .1 |
| 18 | 20 | 5 | 1 | .3 |
| 19 | 20 | 3.5P | 1 | .1 |

P = pentane.

Further experimentation to study the effect of stirring time was conducted.

Example XX 20 parts of trimethoxyboroxine and 2.2 parts of ethyl alcohol were added to EP-201 and manually stirred for 5 seconds. The resulting foam had a density of about .3 g./cc. and reached a maximum temperature of 167° C. The experiment was repeated with 15 second manual stirring. The product possessed a density of about .5 g./cc. and reached a maximum temperature of 143° C. The same formulation mechanically stirred at 4,000 r.p.m. for 5 seconds produced a substantially lighter foam. This shows further that stirring is an important variable. To produce foams of the lowest density vigorous stirring of very short duration is indicated.

In a large number of uses particularly in the insulation industry, foams of very low density are desired since increasing the volume of product per pound of ingredients decreases the cost of the insulation. However, decreasing the density generally decreases the strength of the product and a balance of characteristics must be obtained. In some uses where strength of the foam is important much denser foams are preferred.

Instead of using one prepolymer in the formation of the foams it is possible to use a mixture of dicyclohexene oxide carboxylates or other epoxy prepolymers in admixture with the dicyclohexene oxide carboxylate monomer. Useful in this connection are glycidyl ethers of polyhydric alcohols or phenols. Illustrative of the glycidyl ethers usable are simply diglycidyl monoether; diglycidyl polyethers such as glycidyl ethers of ethylene glycol, trimethylene glycol glycerol and the like, and compounds containing more than two glycidyl groups such as polyglycidyl ethers of glycerol, diglycerol, erythritol, mannitol, sorbitol, polyallyl alcohol and the like. Also included are the glycidyl ethers of a polyhydric phenol including pyrogallol and phloroglucinol and the glycidyl ethers of any dihydric phenol such as resorcinol, catechol and the like or polynuclear phenols such as bis(4-hydroxyphenyl)dimethyl methane and the like. Representative prepolymers of this group are diglycidyl ether of bisphenol A and epoxylated novolacs. Also useful are dicyclopentadiene dioxide, dipentene dioxide, vinyl cyclohexene dioxide and similar monomers.

Since the admixed prepolymer tends to increase the hardening time of the mixture, it is preferred to add it to the dicyclohexene oxide carboxylate material up to about 50% of the total epoxides uses. For example, foam having a density of .24 g./cc. was produced in less than a minute from a 50—50 mixture of EP-201 and ERL-3794 (the latter being an epoxylated novolac having an epoxide equivalent of 170–182 and an average molecular weight of 350–400) using 20 parts of trimethoxyboroxine and 1 part water per 100 parts total prepolymer with manual mixing.

Methods of preparing the epoxy resins as described herein are well known in the art and preparative techniques and further descriptive information may be found in Epoxy Resins, Lee and Neville, McGraw-Hill Book Company, Inc. (1957). In this book it is pointed out that the epoxide compounds of commerce are usually a mixture of the simple monomer, molecules of a low degree of polymerization, and some molecules with a single epoxide group. In the description herein the expression monomer or prepolymer are used interchangeably in reference either to pure epoxide compounds or in reference to these mixtures of epoxides normally sold in commerce. The pure monomer will have at least 2 reactive epoxy groups in each molecule while the mixtures of epoxides will have an average of more than 1 reactive group for each molecule present in the mixture.

According to this invention a wide variety of foams may be produced from very dense to very light materials. Foams can be made in which the product has a low content of boron incorporated within the product up to relatively high boron content. The foams burned slowly with no dripping or sputtering and were superior to polystyrene and urethane foams in this characteristic. They also demonstrated a good resistance to hydrolysis. On immersion tests for twenty-four hours it was ascertained that there was no appreciable loss in strength in most foams and in some instances immersion resulted in an actual gain in strength.

Example XXI

Fast gelling solid cures are obtained simply by mixing a dicyclohexene oxide carboxylate and a lower alkoxyboroxine using less than about 10 parts trialkoxyboroxine, in the absence of a foaming agent. For example, 100 g. of EP-201 and 10 g. of trimethoxyboroxine were mixed and the composition gelled at room temperature to a solid block with some occluded bubbles in 30 seconds. This product exhibited a Barcol hardness of from 40-45 over a wide temperature range from room temperature to 300° F. After only 5-10 minutes, the resin had a lap shear value of 595 at room temperature. With lesser amounts of trialkoxyboroxine, the gelling time is increased slightly and the cured resin is substantially bubble free. Thus a mixture of 5 g. trimethoxyboroxine and 100 g. of EP-201 gelled at room temperature in 90 seconds. This product had a Shore A hardness of 88/98 and a Barcol hardness of 40.

According to the provisions of the patent statutes, I have explained the principle and mode of practicing my invention, have described what I now consider to be its best embodiments. However, I desire to have it understood that, within the scope of the appended claims, the invention may be practiced otherwise than as specifically described.

I claim:

1. A process of curing 3,4-epoxy-6-methylcyclohexylmethyl - 3,4-epoxy-6-methylcyclohexanecarboxylate comprising reacting it with an alkoxy boroxine of the general formula

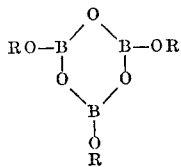

in which R is an alkyl group.

2. A process of preparing a foamed epoxy resin consisting essentially of reacting 100 parts by weight of a prepolymer comprising at least 50% of a 3,4-epoxy-6-methylcyclohexylmethyl - 3,4-epoxy-6-methylcyclohexanecarboxylate with about 20 to 100 parts by weight of a lower trialkoxyboroxine in the presence of up to about 20 parts by weight of a foaming agent selected from the group consisting of lower alkyl borate esters, liquid hydrocarbons, liquid halogenated hydrocarbons and mixtures thereof.

3. A method according to claim 2 in which the lower trialkoxyboroxine is trimethoxyboroxine.

4. A method according to claim 3 in which the foaming agent is trimethyl borate.

5. A process for preparing a foamed epoxy resin consisting essentially of reacting 100 parts by weight of 3,4-epoxy - 6 - methylcyclohexylmethyl - 3,4-epoxy-6-methylcyclohexanecarboxylate with about 20 to 100 parts by weight of a lower trialkoxyboroxine in the presence of up to about 5 parts by weight of a foaming accelerator selected from the class consisting of water, lower alkyl alcohols and mixtures thereof.

6. A process according to claim 5 in which the trimethoxyboroxine is trimethoxyboroxine.

7. A process for preparing a rigid foam which comprises reacting 100 parts by weight of a prepolymer consisting essentially of a major proportion of 3,4-epoxy-6-methylcyclohexylmethyl - 3,4-epoxy-6-methylcyclohexanecarboxylate admixed with up to about 50 weight percent of a member selected from the group consisting essentially of a glycidyl ether of a polyhydric alcohol, a glycidyl ether of a polyhydric phenol, dicyclopentadiene dioxide, dipentene dioxide, vinyl cyclohexene dioxide, and mixtures thereof with about 20 to 100 parts by weight of a material comprising a lower trialkoxyboroxine in the presence of up to about 20 parts by weight of a foaming agent selected from the class consisting of lower alkyl borate esters, liquid hydrocarbons, liquid halogenated hydrocarbons and mixtures thereof and up to about 5 parts by weight of a foaming accelerator selected from the class consisting of water, lower alkyl alcohols and mixtures thereof.

8. A process according to claim 7 in which the lower trialkoxyboroxine is trimethoxyboroxine.

References Cited

UNITED STATES PATENTS

| | | | |
|---|---|---|---|
| 3,025,249 | 3/1962 | Chen | 260—2.5 |
| 3,051,665 | 8/1962 | Wismer et al. | 260—2.5 |
| 3,134,754 | 5/1964 | Brunner et al. | 260—47 |
| 3,154,504 | 10/1964 | Carey et al. | 260—2.5 |

MURRAY TILLMAN, *Primary Examiner.*

SAMUEL H. BLECH, *Examiner.*

J. T. GOOLKASIAN, *Assistant Examiner.*